United States Patent
Oishi et al.

(10) Patent No.: US 7,738,035 B2
(45) Date of Patent: Jun. 15, 2010

(54) LENS BARRIER MODULE AND IMAGE PICKUP APPARATUS HAVING THE SAME

(75) Inventors: Seiichi Oishi, Chiba (JP); Satoru Tada, Chiba (JP); Yoshihisa Kurosawa, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 473 days.

(21) Appl. No.: 11/714,780

(22) Filed: Mar. 7, 2007

(65) Prior Publication Data

US 2007/0160368 A1    Jul. 12, 2007

Related U.S. Application Data

(63) Continuation of application No. PCT/JP2005/016077, filed on Sep. 2, 2005.

(30) Foreign Application Priority Data

Sep. 9, 2004    (JP)    ............................. 2004-263109

(51) Int. Cl.
*H04N 5/225* (2006.01)
(52) U.S. Cl. ........................................ 348/374; 396/452
(58) Field of Classification Search ................ 348/335, 348/363, 373, 374
See application file for complete search history.

(56) References Cited

U.S. PATENT DOCUMENTS

| | | | | | |
|---|---|---|---|---|---|
| 5,993,078 | A | * | 11/1999 | Nomura et al. | ............. 396/448 |
| 6,036,377 | A | * | 3/2000 | Nomura et al. | ............. 396/448 |
| 6,212,335 | B1 | * | 4/2001 | Inazuka | ....................... 396/85 |
| 2002/0135900 | A1 | * | 9/2002 | Nomura et al. | ............. 359/819 |
| 2005/0052560 | A1 | | 3/2005 | Murakami | |

FOREIGN PATENT DOCUMENTS

| | | |
|---|---|---|
| JP | 3-186828 | 8/1991 |
| JP | 5-2130 | 1/1993 |
| JP | 2000-180915 | 6/2000 |
| JP | 2001-5047 | 1/2001 |
| JP | 2001-100275 | 4/2001 |
| JP | 2003-114460 | 4/2003 |
| JP | 2004-184585 | 7/2004 |

* cited by examiner

*Primary Examiner*—Gevell Selby
(74) *Attorney, Agent, or Firm*—Kratz, Quintos & Hanson, LLP

(57) ABSTRACT

A lens barrier module including a substrate in which an opening is defined, sectors opening the opening when picking up an image and closing the opening when not picking up the image, and a motor provided at the substrate and driving the sectors.

5 Claims, 11 Drawing Sheets

LENS BARRIER MODULE AND IMAGE PICKUP APPARATUS HAVING THE SAME

This application is a continuation of international application PCT/JP05/016077 filed Sep. 2, 2005.

BACKGROUND OF THE INVENTION

1. Field of the Invention

This invention relates to lens barrier modules to be downsized, and more particularly, to a lens barrier module located at a front face of a lens body tube so as to protect an image pickup lens.

2. Description of the Related Art

Conventionally, there have been cameras with the lens barrier function to protect the lens from dust or the like entering from the outside. Generally, the lens barrier is integrally formed at a front face side of a lens body tube, and protects the lens in the lens body tube, for example, by closing sectors (blades) swingably provided. For instance, Japanese Patent Application Publication No. 3-186828 discloses a shutter apparatus having a lens barrier, and proposes a technique of driving the sectors for the shutter or lens and driving the lens barrier by means of one actuator. The lens barrier of the shutter apparatus has a configuration in which the lens barrier is moved through a pinion, gear, cam, and actuating lever.

The shutter apparatus of Japanese Patent Application Publication No. 3-186828, however, the drive motor of the sectors for shutter or the lens is also used for driving the lens barrier. For this reason, the drive mechanism such as a motor or the like extends long in the lens body tube from the proximity of the location of the sectors for the shutter to the lens barrier mechanism at an end of the lens body tube. Also, the shutter apparatus is provided with a switch mechanism switching the drive motor of the sectors for shutter or the lens and the barrier drive. This causes the drawbacks in that the structure of the lens body tube including the lens barrier function is complicated, and the size thereof is increased. Also, the lens barrier mechanism is integrally incorporated into the chassis and cannot used for another lens body tube, lacking in versatility.

In addition, the lens barrier of the shutter apparatus is opened or closed through the cam and the operation lever, thereby making it difficult to hold the barrier (sectors) at a closed or open position stably. Accordingly, in order to prevent and unstable movement of the sectors, there may be separately provided a stopper mechanism that retains the operation lever or the sectors at a stop position. However, such separately provided stopper mechanism will further lead to drawbacks in that the lens barrier mechanism is complicated and the size thereof is increased.

SUMMARY OF THE INVENTION

The present invention addresses the above-described drawbacks and has an object of providing a small-sized lens barrier module with versatility.

According to an aspect of the present invention, there is provided a lens barrier module including: a substrate in which an opening is defined; sectors opening the opening when picking up an image and closing the opening when not picking up the image; and a motor provided at the substrate and driving the sectors. This lens barrier module can be formed attachably to another lens body tube, and can be used as an independent optical part with versatility.

In the above-described lens barrier module, the substrate may include a sector substrate in which the sectors are provided and a motor substrate in which the motor is provided. In this case, it is possible to form a small-sized lens barrier module having the sectors and the motor at a single substrate. In addition, in the above-described lens barrier module, the sectors may be driven the motor via a swinging member, the swinging member may be a rotatable swinging ring, and further comprising a worm gear engaged with the swinging ring and transmitting a drive power from the motor. With such configuration, since the unstable movement of the swinging ring is regulated by the worm gear, the lens barrier module is so provided as to have a function of preventing an event of opening the sectors at a closed state. In addition, with this configuration, the sectors can be held at stop positions without a separate stopper mechanism. An image pickup apparatus in which the above-described lens barrier module is mounted can be downsized.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
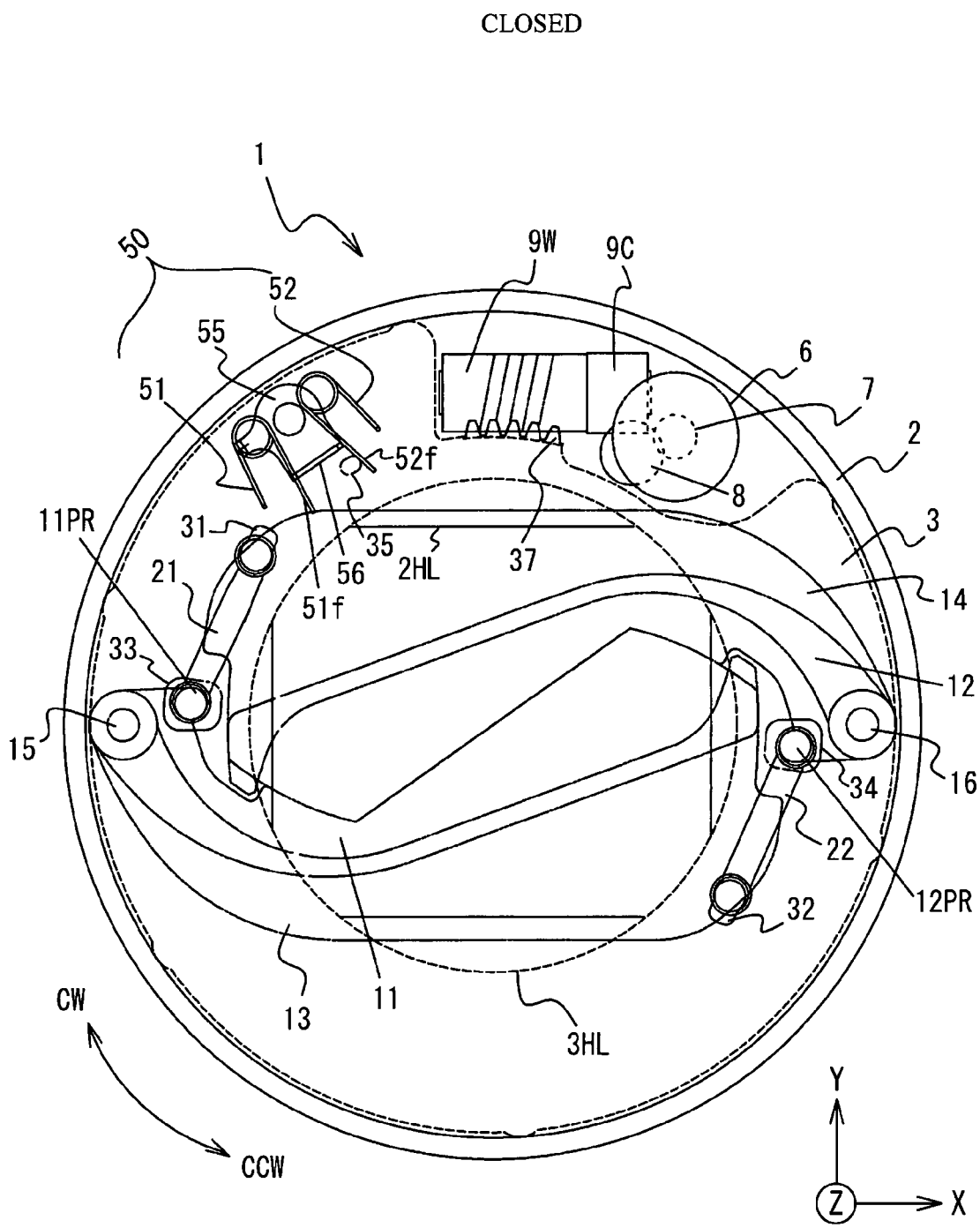
FIG. 1 is a view showing a closed state of a lens barrier apparatus.
Figure 2:
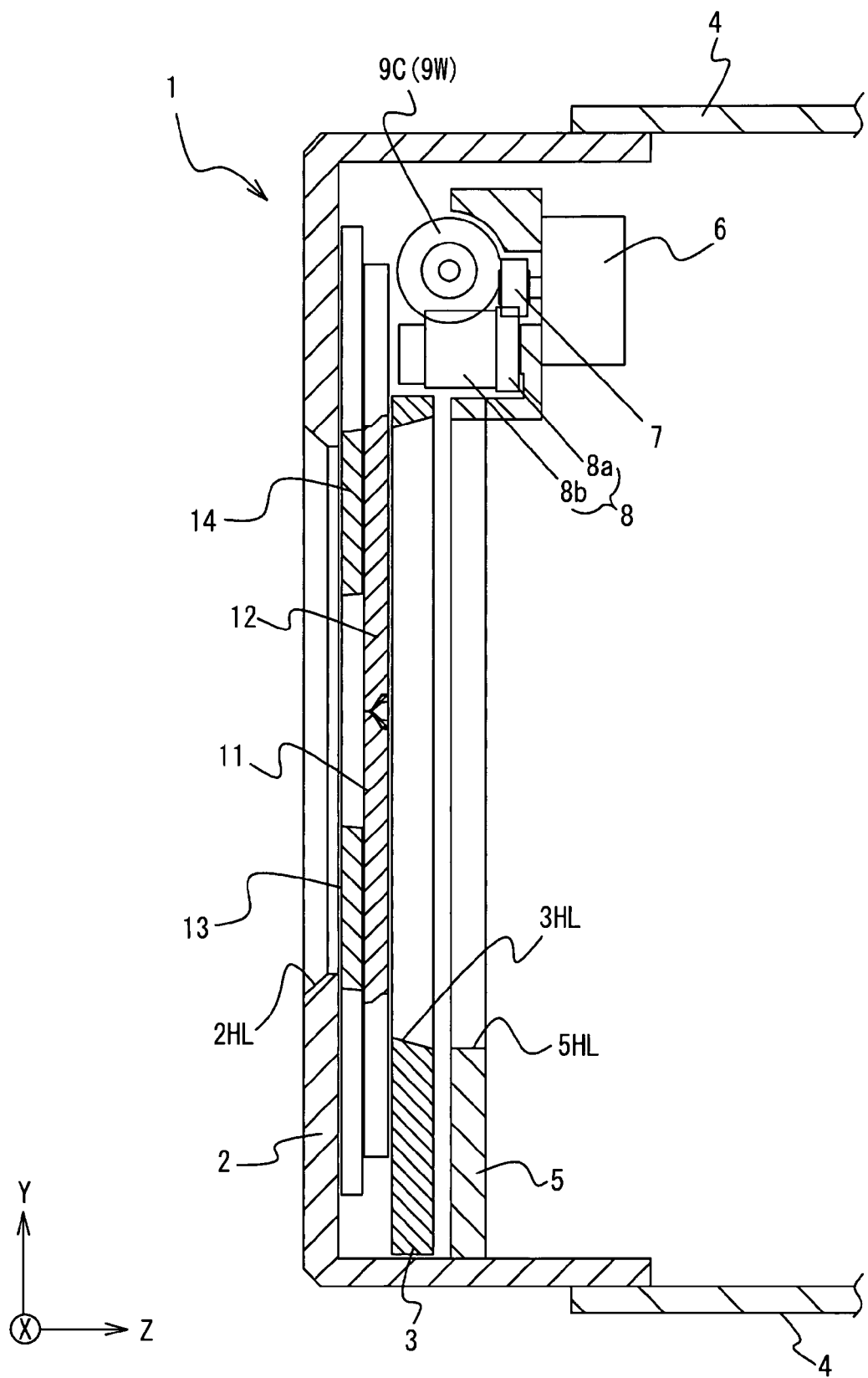
FIG. 2 is a view showing a cross-sectional view of the lens barrier apparatus in FIG. 1.
Figure 3:
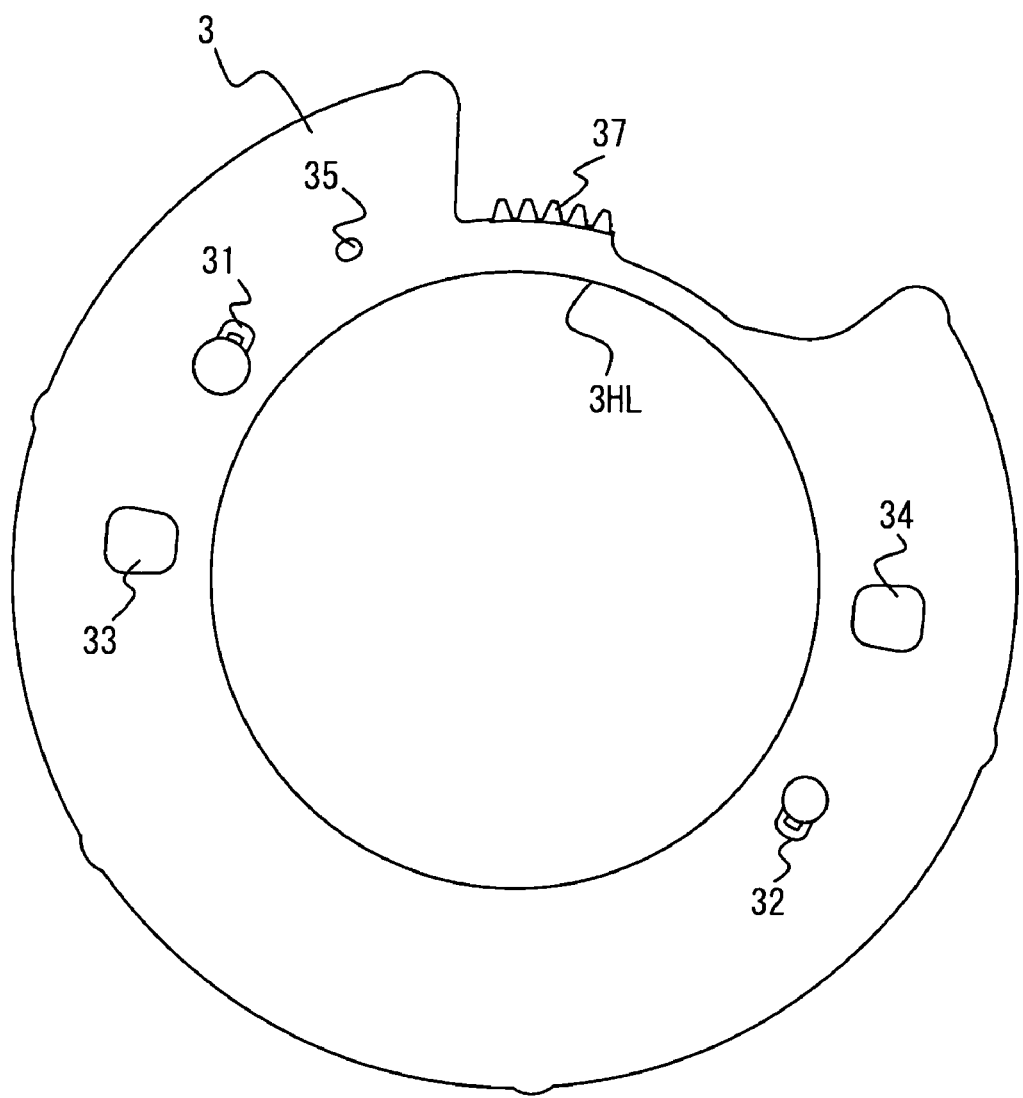
FIG. 3 is a view showing a swinging ring 3 taken out from the lens barrier apparatus.

A description will now be given of, with reference to the accompanying drawings, a lens barrier apparatus employed in an embodiment of the present invention. The lens barrier apparatus is so opened to be able to take a photo with an image pickup apparatus, a film or the like, and is closed to protect the lens or the like when not taking a photo. FIG. 1 shows a closed state of a lens barrier apparatus 1. FIG. 2 shows a cross-sectional view of the lens barrier apparatus 1 in FIG. 1. FIG. 3 is a view showing a swinging ring 3 taken out from the lens barrier apparatus 1. The lens barrier apparatus 1 is attached to a front side of a lens body tube of a camera, when used. In addition, herein, as shown in FIG. 1 and FIG. 2, an X-axis, a Y-axis and a Z-axis are virtually provided in order to facilitate the understanding of the present invention. The front side of the lens barrier apparatus 1 is a left-hand side in the Z-axis direction in FIG. 2, and a rear side thereof is a right-hand side in the Z-axis direction in FIG. 2. As shown, a lens body tube 4 is installed at the rear side.

A description will be given of, with reference to FIG. 1 through FIG. 3, a structure of the lens barrier apparatus 1. The lens barrier apparatus 1 includes four sectors (shatter blades) 11 through 14 swinging. Specifically, the lens barrier apparatus 1 includes a first inner sector 11, a second inner sector 12, a first outer sector 13 and a second outer sector 14. These sectors 11 through 14 are pivotally attached at a sector plate 2. The sector plate 2 has an opening 2HL for taking a photo at a middle portion thereof. In addition, as shown in FIG. 1, these sectors 11 through 14 pivot about spindles 15 and 16 provided at predetermined positions of the sector plate 2. The first inner sector 11 and the first outer sector 13 pivot about the spindle 15, and the second inner sector 12 and the second outer sector 14 pivot about the spindle 16. Also, as shown in FIG. 2, the first inner sector 11 and the second inner sector 12 are present in a same plane such that end portions thereof are contact with each other when the first inner sector 11 and the second inner sector 12 close. The first outer sector 13 and the second outer sector 14 are respectively arranged at slight intervals at the front face side of the inner sectors 11 and 12. The sectors 11 through 14 will be described later in detail.

The swinging ring 3 serving as a swinging member is installed at the rear side (the right-hand side in FIG. 2) of the sectors 11 through 14. FIG. 3 shows the swinging ring 3 only so as to be recognized easily. The rotation of the swinging ring 3 in a circumferential direction allows the sectors 11 through 14 to pivot. The swinging ring 3 partially has a gear train 37 at a peripheral portion thereof. The gear train 37 are engaged with a worm gear 9W having a rotation axis of the X-axis direction. The swinging ring 3 receives the drive power of the worm gear 9W, and rotates in both directions. The swinging ring 3 has an opening 3HL for taking a photo at the middle portion thereof.

The swinging ring 3 is provided with latch portions 31 and 32 respectively latched with one ends of coil springs 21 and 22, which are two bias members. Also, apertures 33 and 34 are provided at peripheral portions where the other ends of the coil springs 21 and 22 are positioned. In addition, the first inner sector 11 and the second inner sector 12 respectively have projections 11PR and 12PR respectively engaged with the other ends of the coil springs 21 and 22. The projections 11PR and 12PR respectively project tops thereof through the apertures 33 and 34 in the opposite direction to the swinging ring 3. By engaging the other ends of the coil springs 21 and 22 with the tops, the biasing forces of the coil springs 21 and 22 are respectively applied to the first inter sector 11 and the second inter sector 12. More specifically, as shown in FIG. 1, the projection 11PR of the first inter sector 11 is engaged with the other end of the coil spring 21, and the projection 12PR of the coil spring 21 is engaged with the other end of the coil spring 22. At the rear side of the swinging ring 3 (the right-hand side in FIG. 2) is arranged a motor substrate 5. The motor substrate 5 has an opening 5HL for taking a photo. A motor 6 serving as a drive means is mounted on the motor substrate 5. A rotor kana (gear) 7 is secured at a rotor spindle of the motor 6. The rotor kana 7 is engaged with a gear 8a, which is one of a middle gear 8 configured as a two-stage gear. Another gear 8b of the middle gear 8 is engaged with a gear 9C integrally rotating with the worm gear 9W. Herein, the rotor spindle of the motor 6 is arranged in parallel with Z axis, and a shaft of the worm gear 9W is arranged in parallel with X axis. Thus, the direction of the rotation axis is converted by employing, for example, a bevel gear, a screw gear, and the like as another gear 8b of the middle gear 8 and the gear 9C.

Also, in the lens barrier apparatus 1, the motor substrate 5 is arranged at the rear side of the swinging ring 3 as mentioned above, and the motor 6 driving the sectors 11 through 14 is arranged at the motor substrate 5. The lens barrier apparatus 1 is not configured such that the driving power is supplied from a conventional built-in lens barrier generally employed. The lens barrier apparatus 1 includes a unique driving motor, so the driving system is separately provided.

Accordingly, it is unnecessary that the lens barrier apparatus 1 be conventionally provided with a long driving shaft, a switching mechanism or the like, like the conventional one, in order to obtain the drive power from the body tube, thereby enabling the lens barrier apparatus 1 to be simply configured and miniaturized. Furthermore, in accordance therewith, the lens body tube attached to the lens barrier apparatus 1 can be simply configured. Also, as shown in FIG. 2, a circumferential portion of the sector plate 2 is manufactured in a cylindrical shape and the sector plate 2 functions as a housing of the lens barrier apparatus 1. Inside of the housing, not only the sectors 11 through 14 and the swinging ring 3 but also the motor 6 secured to the motor substrate 5 are integrally housed. Therefore, the lens barrier apparatus 1, being incorporated into a unit, permits to be treated as a separate optical component with general versatility, unlike the conventional lens barrier. For example, the lens barrier apparatus 1 may be configured to be threadably mounted on the lens body tube 4 so as to be detachably provided.

Additionally, the lens barrier apparatus 1 is configured such that the drive power is transmitted from the motor 6 to the swinging ring 3 via the worm gear 9W, as mentioned above. With such configuration, the drive power (torque) of the worm gear 9W is transmitted to the swinging ring 3 by the gear train 37. In contrast, the worm gear 9W regulates the movement generated from the swinging ring 3, since a self-stop function of a worm gear is great, as compared to that of a spur gear. That is to say, since the worm gear 9W is arranged between the motor 6 and the swinging ring 3, it is configured to transmit the drive power irreversibly to the swinging ring 3.

In the lens barrier apparatus 1, the worm gear 9W is engaged with the gear train 37 of the swinging ring 3 as described, allowing the swinging ring 3 to be certainly moved to a desired position. Therefore, the swinging ring 3 is stably held at a stop position. Since the sectors 11 through 14 swing on the basis of rotational movement of the swinging ring 3, the sectors 11 through 14 can be urged to swing with certainty and be further held in that state in the lens barrier apparatus 1.

Figure 4:
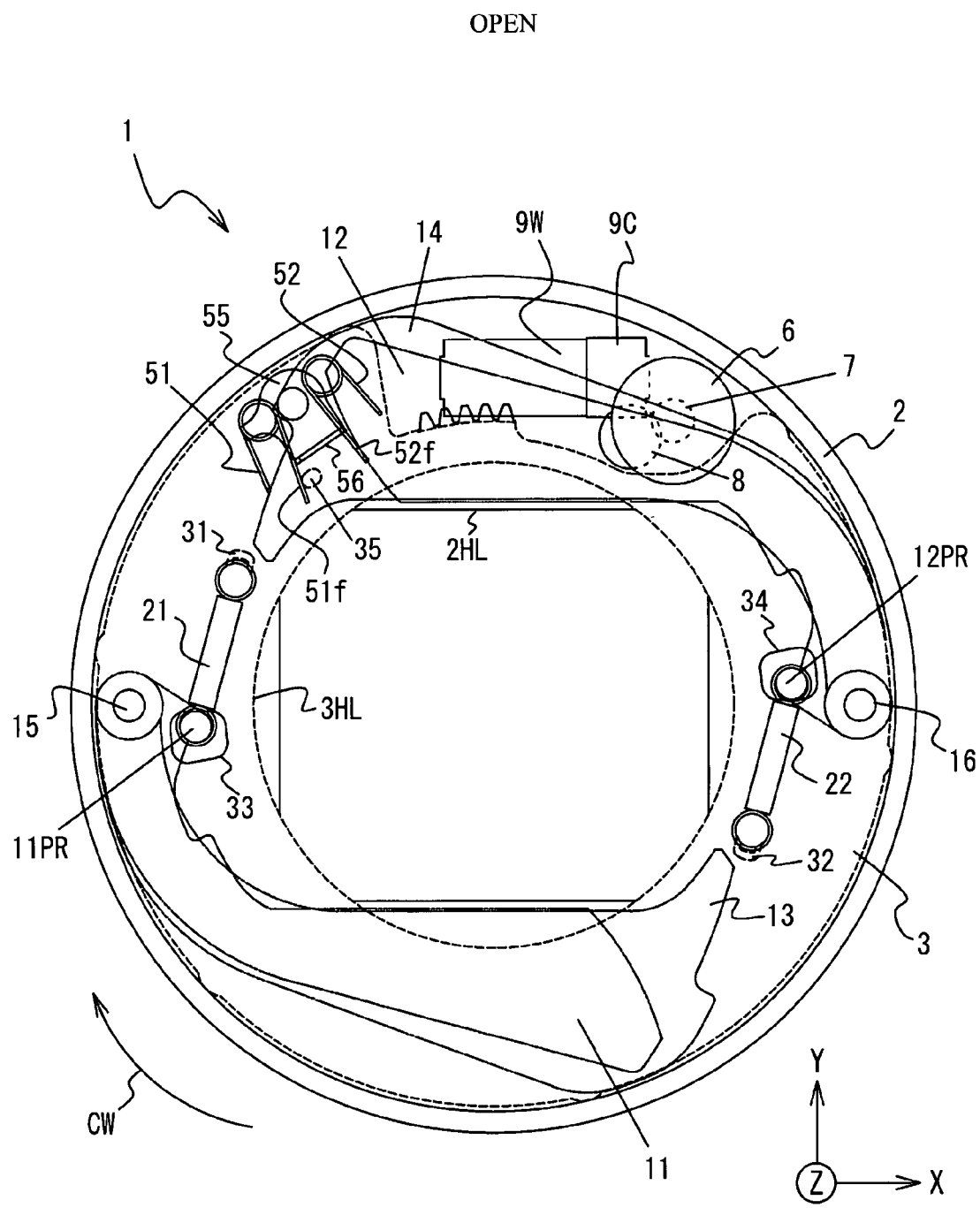
FIG. 4 is a view showing an open state of the lens barrier apparatus.

FIG. 4 shows an open state of the lens barrier apparatus 1. The open state in FIG. 4 is formed, when the worm gear 9W rotates in a predetermined number of times from the closed state in the FIG. 1, in a clockwise direction as viewed in the X-axis direction. At this time, the swinging ring 3 moves in a counterclockwise direction CCW by a given amount. Based on such movement of the swinging ring 3, each of the sectors 11 through 14 recedes from the opened portion to form the open state. After the open state is provided, the drive of the swinging ring 3 is regulated by the worm gear 9W in a similar manner to the closed state. Therefore, the sectors 11 through 14 are stably held in the open state.

Figure 5A:
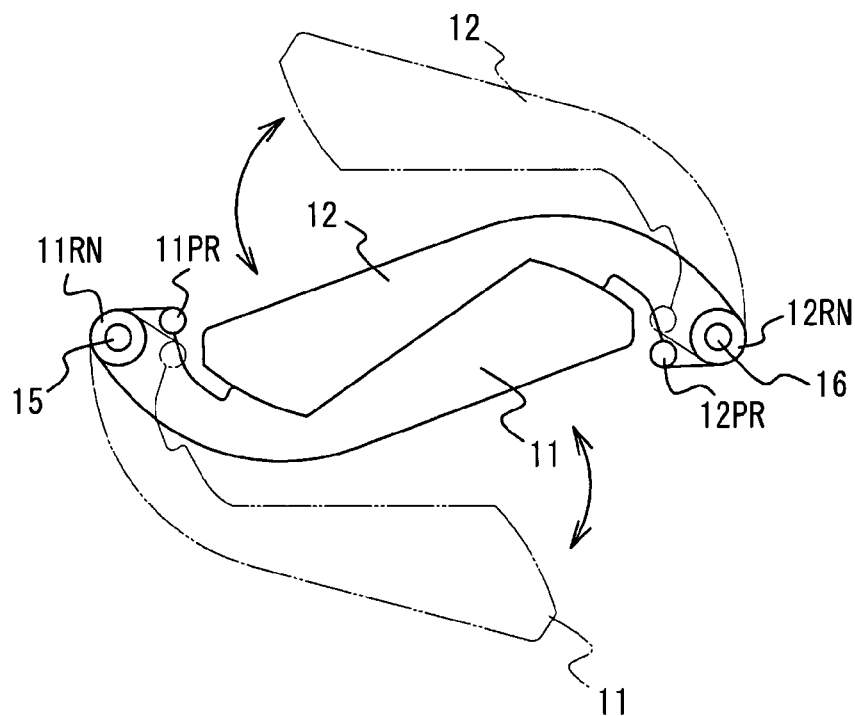
FIG. 5A and FIG. 5B show a successive operation of sectors included in the lens barrier apparatus.
Figure 5B:
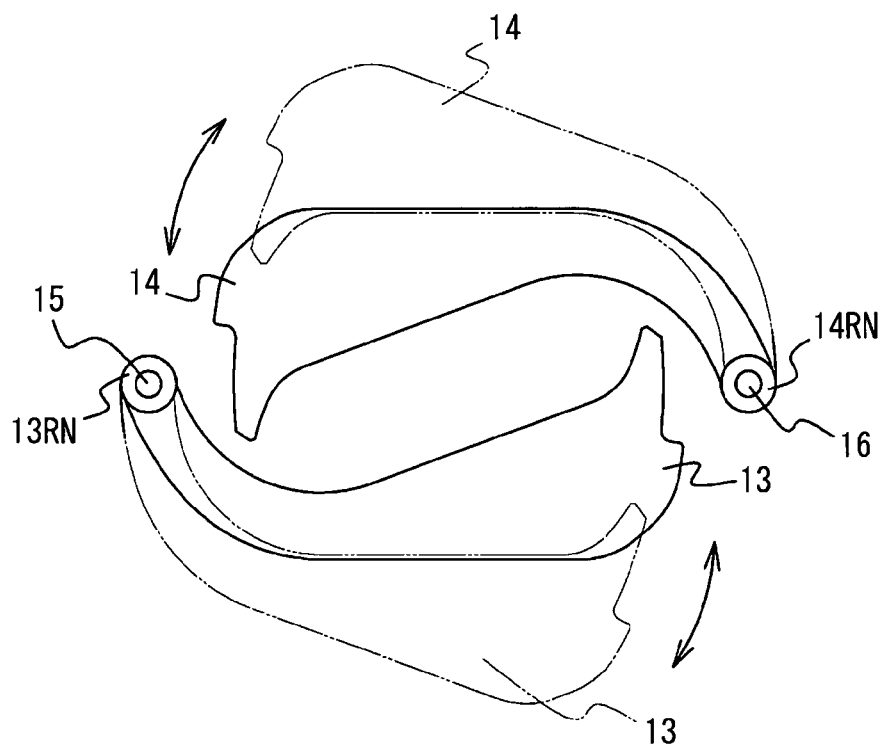

The lens barrier apparatus 1 is configured to close the opening by use of the four sectors 11 through 14. The use of a plurality of the sectors described above promotes downsizing. FIG. 5A through FIG. 6B are views describing a successive operation of the sectors 11 through 14 included in the lens barrier apparatus 1. FIG. 5A shows only the first inner sector 11 and the second inner sector 12 from the closed state in FIG. 1 to the open state in FIG. 4. In FIG. 5A, the sectors 11 and 12 are illustrated with two-dot chain line in the open state. Also, FIG. 5B shows only the first outer sector 13 and the second outer sector 14 in the same manner.

In addition, since each sector has a thin blade shape, portions thereof that are pivotally fitted to the spindles 15 and 16 are reinforced. At other portions of the sectors 11 through 14 fitted to the spindle, ring-shaped projections 11RN through 14RN are integrally formed. The ring-shaped projections 11RN through 14RN serve as roller bearings so as to keep a contact area with the spindles 15 and 16 and so that each sector stably swings. In addition, this ring-shaped projections 11RN through 14RN function as a spacer that respectively holds constant clearances between: the first inner sector 11 and the first outer sector 13, which are arranged to face each other; the first inner sector 11 and the swinging ring 3; the first outer sector 13 and the sector plate 2; the second inner sector 12 and the second outer sector 14; the second inner sector 12 and the swinging ring 3; and the second outer sector 14 and the sector plate 2.

The first outer sector 13 and the second outer sector 14 are configured to move together (be interlocked) with the swing of the first inner sector 11 and the second inner sector 12. A description will now be given of the structure that swings the first inner sector 11 and the second inner sector 12, and then the structure that causes the first outer sector 13 and the second outer sector 14 to move.

Referring now to FIG. 1 again, as described above, the projection 11PR of the first inner sector 11 and the projection 12PR of the second inner sector 12 are respectively coupled to one ends of the coil springs 21 and 22 through the apertures 33 and 34. That is to say, the swinging ring 3 is interposed between the coil spring 21 and the first inner sector 11, and between the coil spring 22 and the first inner sector 12. Further, although the projections 11PR and 12PR and the coil springs 21 and 22 are not shown in FIG. 2, the projections 11PR and 12PR project in the right-hand direction (the rear side of the lens barrier apparatus 1), and are engaged with one ends of the coil springs 21 and 22 that are situated at the rear side of the swinging ring 3. Herein, there is also provided a recess portion (not shown) at the rear side of the swinging ring 3 of the lens barrier apparatus 1, so the coil springs 21 and 22 are housed in the recess portion. By employing such configuration, downsizing is achieved, thereby preventing the interference with the motor substrate 5 placed at the rear side of the swinging ring 3.

A description will be given of the operation when the open state shown in FIG. 4 is shifted to the closed state shown in FIG. 1. In the open state shown in FIG. 4, the swinging ring 3 reaches a farthest position in the counterclockwise direction CCW. At this time, an end portion of the aperture 33 of the swinging ring 3 comes into contact with the projection 11PR, and the projection 11PR is rotated about the spindle 15 in the clockwise direction CW. This allows the first inner sector 11 to rotate about the spindle 15 in the clockwise direction CW, enabling the opening 2HL to be opened. Likewise, the opposite side aperture 34 presses up the projection 12PR to allow the inner sector 12 to rotate about the spindle 16 in the clockwise direction CW and to open the opening 2HL.

When the swinging ring 3 rotates in the clockwise direction CW at a predetermined number of times from the state in FIG. 4, the closed state in FIG. 1 is achieved. When the swinging ring 3 starts rotating in the clockwise direction CW from the open state in FIG. 4, the apertures 33 and 34 are respectively disengaged from the projections 11PR and 12PR, however, the projections 11PR and 12PR also follow the swinging ring 3 and are rotated by the biasing forces of the coil springs 21 and 22. Consequently, when the swinging ring 3 is rotated to the state of FIG. 1, the inner sectors 11 and 12 are abutted to form the closed state by the biasing forces of the coil springs 21 and 22.

Figure 6A:
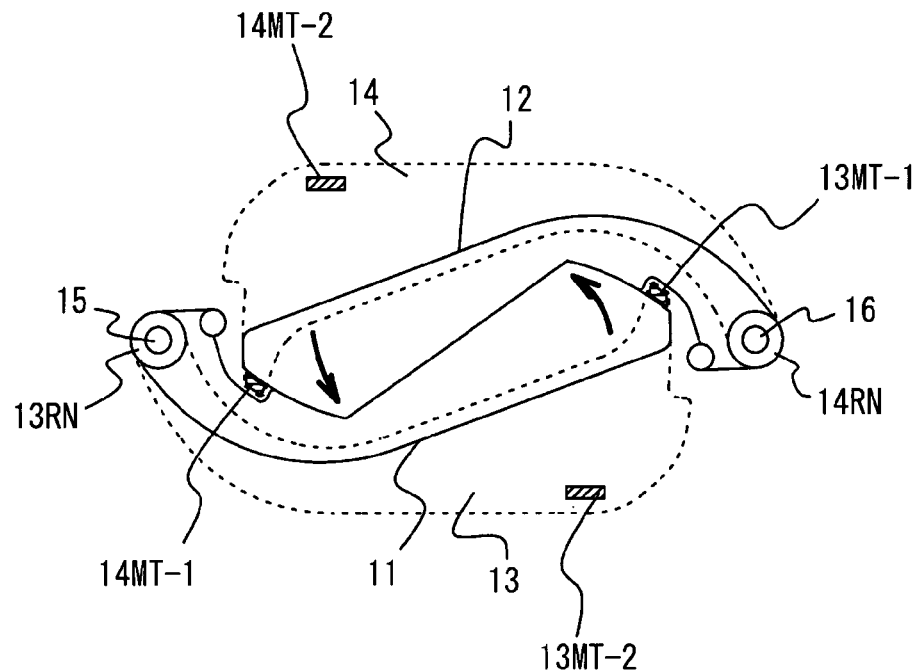
FIG. 6A and FIG. 6B show the successive operation of sectors included in the lens barrier apparatus.
Figure 6B:
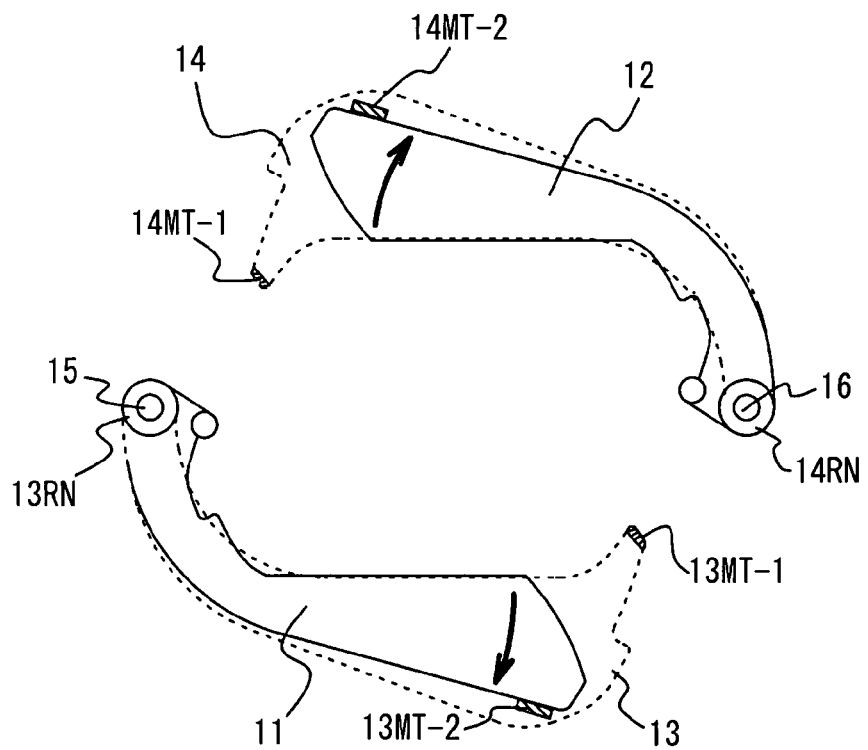

The first outer sector 13 and the second outer sector 14 follow the inner sectors 11 and 12 swinging as mentioned above. FIG. 6A and FIG. 6B are views showing, in particular, the four sectors 11 through 14. FIG. 6A shows the four sectors in the closed state shown in FIG. 1. On the other hand, FIG. 6B shows the four sectors in the open state shown in FIG. 4.

The first outer sector 13 has a contact piece 13MT-1, which comes into contact with the first inner sector 11 when the first inner sector 11 moves in the closing direction. As shown in FIG. 6A, when the first inner sector 11 swings in the direction of an arrow, the first inner sector 11 pushes the contact piece 13MT-1 of the first outer sector 13, allowing the first outer sector 13 to follow the first inner sector 11. The second outer sector 14 also has a contact piece 14MT-1, swinging in the same manner.

Furthermore, the first outer sector 13 further has a contact piece 13MT-2 at another position thereof, as shown in FIG. 6B. This contact piece is arranged in such a position where the first inner sector 11 moves to the opened position in the direction of an arrow. Accordingly, the first outer sector 13 follows the first inner sector 11, and then opens. In the second inner sector 12 and the second outer sector 14, the contact piece 14MT-2 is provided in the same manner. Therefore, as shown in FIG. 1 and FIG. 4, the rotation of the swinging ring 3 allows the four sectors 11 through 14 to swing in given trajectories and to provide the closed state and the open state. Then, in the closed state shown in FIG. 1, the four sectors 11 through 14 collectively close the opening portion to prevent dust, sand or the like from entering the inside thereof. The sectors are separately provided and configured as described above and the outer sector is caused to swing with the inner sector, thereby also achieving miniaturization.

In the lens barrier 1, after the state of FIG. 1 or FIG. 4 is achieved, the swinging ring 3 is kept in a predetermined position by means of the worm gear 9W. Thereby, the lens barrier apparatus 1 prevents the sectors 11 through 14 from being opened in the closed state and prevents the sectors 11 through 14 from being closed in the open state, by an unexpected movement of the swinging ring 3. Also, the swinging ring 3 is certainty moved by means of the worm gear 9W. This enables the swinging operation of the sectors 11 through 14 to become stable.

Figure 7:
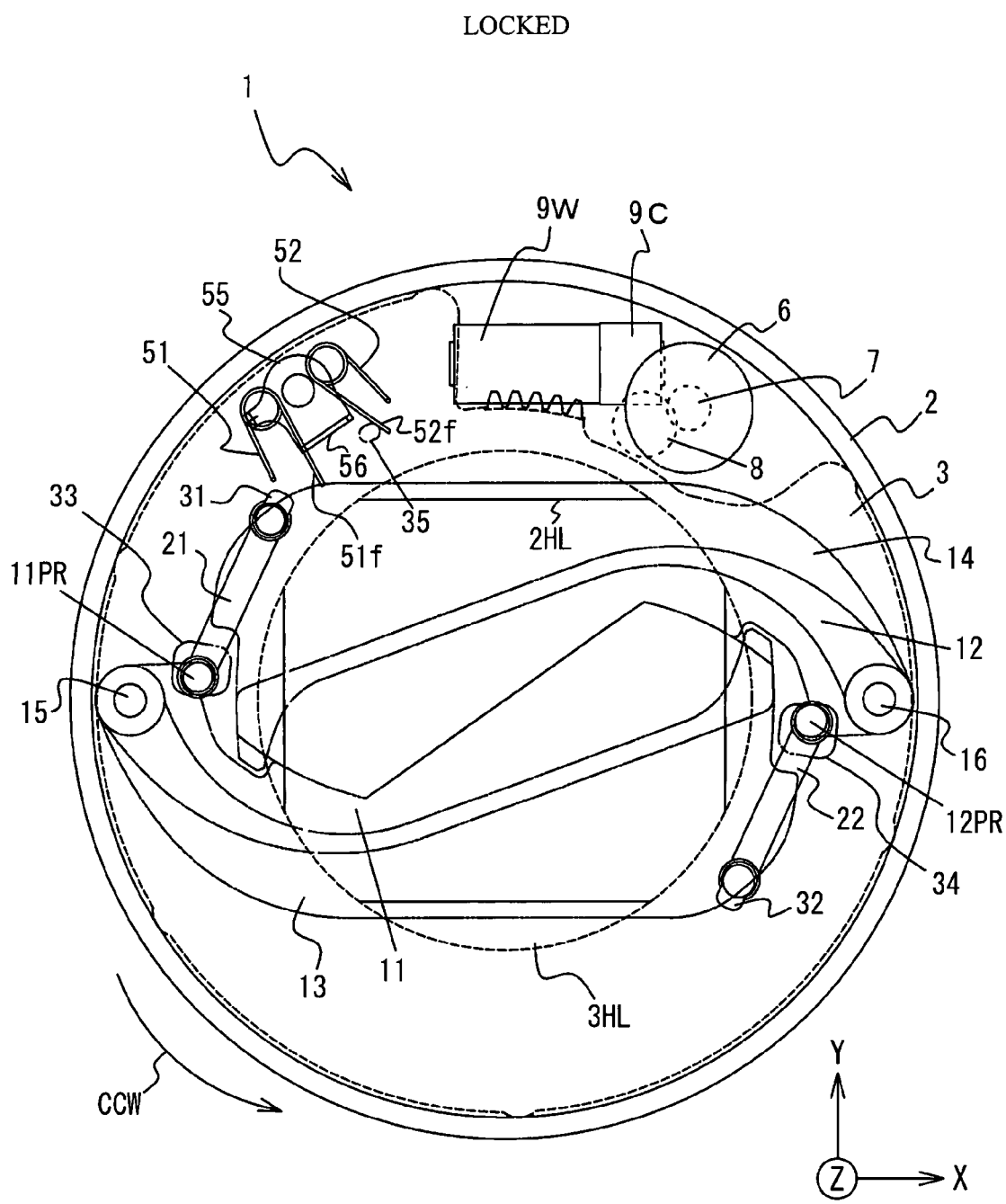
FIG. 7 is a view showing a locked state of the sectors in the lens barrier apparatus.

Furthermore, the lens barrier 1 preferably includes a configuration where the above-mentioned sectors 11 through 14 are held (locked) in the closed state. This configuration will be described below. FIG. 7 shows a locked state of the sectors 11 through 14 in the lens barrier apparatus 1. In the closed state shown in FIG. 1, the projections 11PR and 12PR of the inner sectors 11 and 12 are internally positioned without being in contact with the apertures 33 and 34. That is, the first inner sectors 11 and 12 are kept in such positions that the opening 2HL of the sector plate 2 is closed by the biasing forces of the coil springs 21 and 22. Additionally, the above-described opening 3HL of the swinging ring 3 and the opening 5HL of the motor substrate 5 are formed at positions to correspond to the opening 2HL of the sector plate 2 (see FIG. 2).

As stated heretofore, even at the time the inner sectors 11 and 12 are at such positions so as to close the opening 2HL, the swinging ring 3 is certainly stopped by the worm gear 9W, preventing the sectors from opening by an unexpected movement of the swinging ring 3. However, even when an external force is applied to the sectors themselves, it is preferable to have a configuration where the closed state is kept with certainty. Hence, this lens barrier apparatus 1 also includes another configuration which enables the sectors to be held at the closed position.

The locked state shown in FIG. 7 is formed by further rotating the swinging ring 3 in the clockwise direction CW from the closed state shown in FIG. 1, against the biasing forces of the coil springs 21 and 22. At this time, the aperture 33 is brought into contact with the projection 11PR of the first inner sector 11, at an opposite end portion to that in the open state (of FIG. 4). Similarly, the aperture 34 is brought into contact with the projection 12PR of the second inner sector 12, at an end portion. To achieve this state, the engaging amount of the worm gear 9W and the gear train 37 is so designed that the worm gear 9W can further rotate from the closed state shown in FIG. 1. Accordingly, the worm gear 9W can be rotated by one more step from the state of FIG. 1. In the locked state, in the same manner as described above, the worm gear 9W firstly regulates (locks) the movement of the swinging ring 3. Then, end portions of the apertures 33 and 34 of the swinging ring 3 are brought into contact with the projections 11PR and 12PR, so that the movement of the inner sectors 11 and 12 are limited in the operations thereof. Furthermore, by the above-mentioned structure, the outer sectors 13 and 14 are regulated by the inner sectors 11 and 12. Consequently, in the locked state shown in FIG. 7, the sectors 11 through 14 can be retained surely in the closed state, thereby achieving the structure, in which the front side of the lens body tube 4 is shielded and the inside thereof is protected.

Furthermore, the lens barrier apparatus 1 includes a switch mechanism for detecting the states of the sectors 11 through 14. A description will now be given, with reference to FIG. 1 (closed), FIG. 4 (opened), and FIG. 7 (locked), of the switch mechanism. A switch piece 55 forming a part of a switch mechanism 50 is fixed at an upper-left portion of the motor substrate 5. The switch piece 55 is formed with a conductive member, and a segment 56, which stands up from the motor substrate 5, is formed at an end portion of the switch piece 55. At both sides of the switch piece 55 are arranged coil-shaped conductive springs 51 and 52 serving as switches. One ends of the springs 51 and 52 are latched with the motor substrate 5. Such latched one ends are electrically coupled to the switch piece 55 at the rear side of the motor substrate 5.

Other ends of the springs 51 and 52 are formed as free ends 51*f* and 52*f*, which are located so as to be contactable with the segment 56 of the switch piece 55. Also, the above-mentioned swinging ring 3 has a projection 35, which is brought into contact with the free ends 51*f* and 52*f*, when the swinging ring 3 rotates (see FIG. 3). The switch mechanism 50 is formed to include the projection 35 of the swinging ring 3.

When the swinging ring 3 is shifted to the opened position (shown in FIG. 4), the free end 51*f* of the spring 51 serving as a first switch (SW1) is disengaged from the segment 56 by the projection 35. Also, when the swinging ring 3 is shifted to the closed position (shown in FIG. 1), the free end 52*f* of the spring 52 serving as a second switch (SW2) is disengaged from the segment 56 by the projection 35. As a result, by on (ON) and off (OFF) of the switches SW1 and SW2, the position of the swinging ring 3 can be detected. Therefore, the state of sectors 11 through 14 can be recognized in the lens barrier apparatus 1 based on the position of the swinging ring 3.

Figure 8:
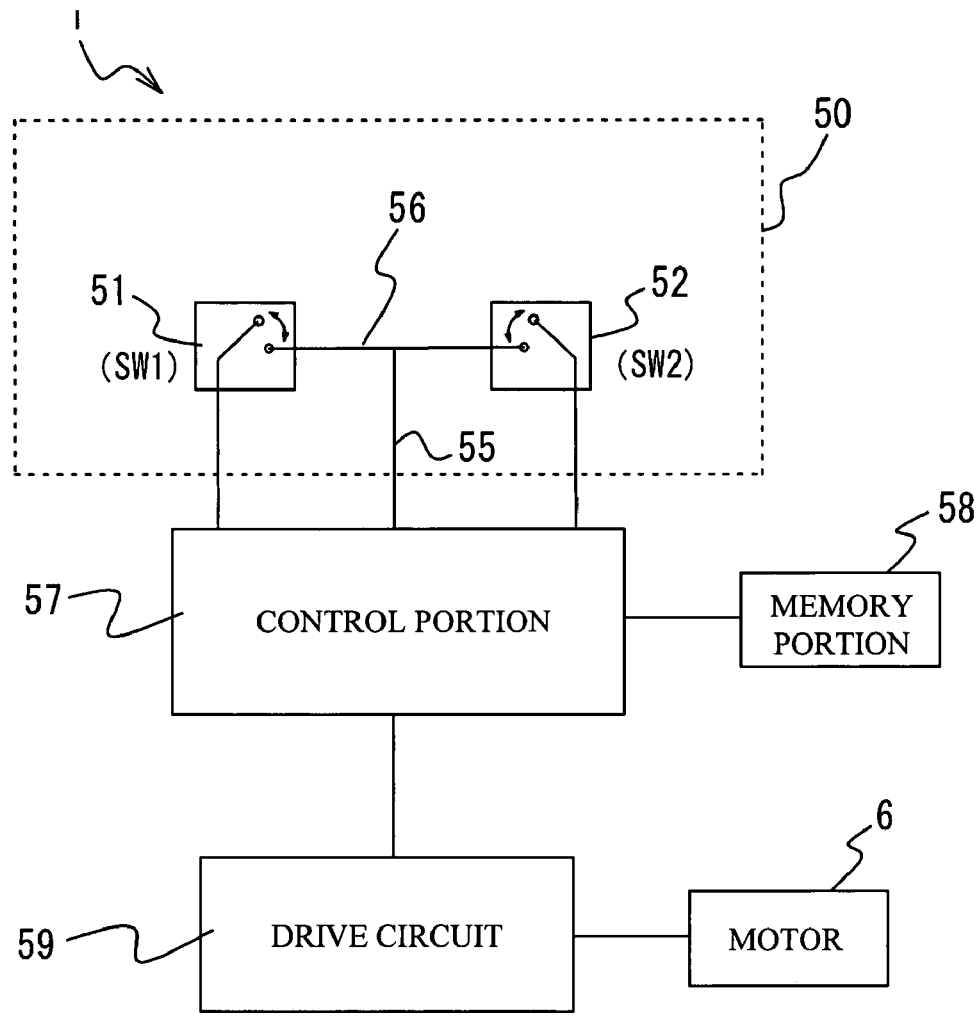
FIG. 8 is block diagram of the lens barrier apparatus.

FIG. 8 is block diagram of the lens barrier apparatus 1. The lens barrier apparatus 1 includes a control portion 57, which monitors on and off of the switches SW1 and SW2. The control portion 57, for example, is mainly composed of a CPU and is connected to a memory portion 58. The memory portion 58 includes: a ROM storing a program for driving the lens barrier apparatus 1; and a RAM providing an area of computation. The control portion 57 reads a predetermined program from the memory portion 58, and controls the motor 6 that drives the above-mentioned worm gear 9W through a drive circuit 59. Additionally, FIG. 8 illustrates an example of a configuration where the lens barrier apparatus 1 includes the control portion 57 and the memory portion 58. The control portion 57 and the memory portion 58, herein illustrated, may be configured with a control device installed in the lens body tube 4 connected by the lens barrier apparatus 1 or in a camera (not shown) equipped with the lens body tube 4.

Figure 9:
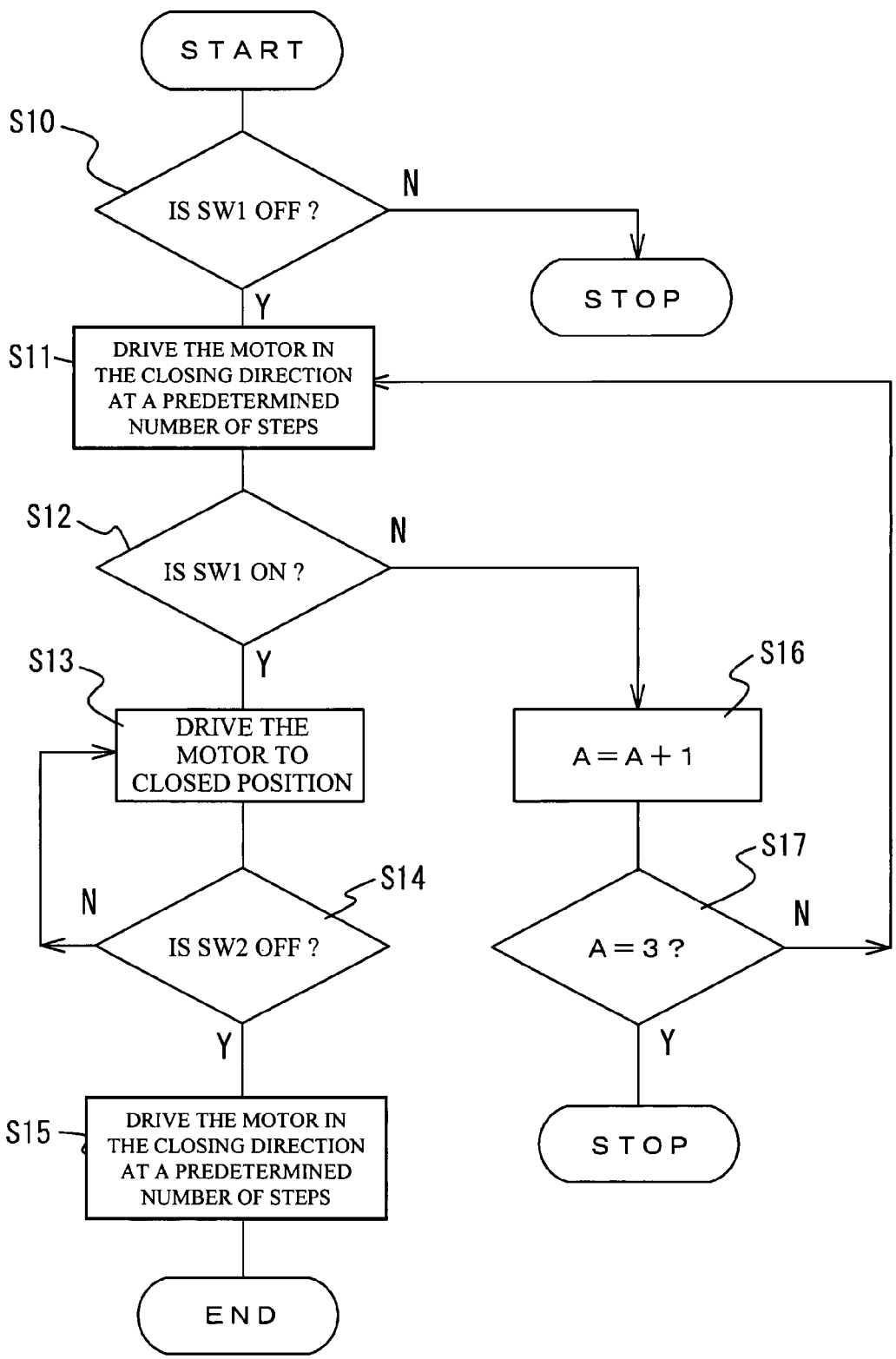
FIG. 9 shows a flowchart showing an example of processing in which the sectors in the lens barrier apparatus are shifted from the open state to a closed state and is then shifted to the locked state.

FIG. 9 shows a flowchart showing an example of processing in which the sectors 11 through 14 of the lens barrier apparatus 1 are shifted from the open state (shown in FIG. 4) to the closed state (shown in FIG. 1) and is then shifted to the locked state (shown in FIG. 7). The process of the flowchart is performed by the above-described control portion 57. The flowchart is activated by turning on a switch (not shown) for closing a barrier, installed in the lens barrier apparatus 1 or in the camera.

The control portion 57 recognizes that the switch SW1, (reference numeral 51 shown in FIG. 5) is in an off state (S10). This flowchart is performed when the sectors are closed from the open state shown in FIG. 4. The free end 51*f* is disengaged from the segment 56 of the switch piece 55 by the projection 35, and is in an off state. This is a normal state. Accordingly, in step S10, when the off state cannot be recognized, the control portion 57 determines abnormal and stops processing of the flowchart.

When the control portion 57 recognizes the off state of the switch SW1 in step S10, the control portion 57 drives the motor 6 in the closing direction at a predetermined number of steps (for example, three steps)(S11) and recognizes that the switch SW1 turns on (S12). If the SW1 does not turn on after performing this step just once, the control portion 57 increments a memory A by one to drive the motor 6 again (S16). If the SW1 does not turn on even after this process is repeated, for example, three times, it is determined that there is something wrong and the processing is stopped.

Meanwhile, in the step S12, if the on state of the switch SW1 is recognized, the control portion 57 allows the motor 6 to drive further in the closing direction until the switch SW2 (reference numeral 52 shown in FIG. 1) turns off. By this process, the closed state shown in FIG. 4 is provided. Subsequently, the control portion 57 drives the motor in the closing direction by a predetermined number of steps (S15). The locked state of FIG. 7 is formed by driving the motor finally, and the processing of the flowchart is finished.

In the above-described lens barrier apparatus 1 employed in this embodiment, the drive power from the motor 6 is transmitted through the worm gear 9W to the swinging ring 3 in one direction. The worm gear 9W is engaged with the gear train 37 of the swinging ring 3 and the rotation of the worm gear 9W rotates the swinging ring 3, so that the sectors 11 through 14 can swing with certainty. With Such configuration, the worm gear 9W regulates the movement of the swinging ring 3 surely after the stop. Consequently, the sectors 11 through 14 can be held in the open state and in the closed state. Thus, the use of the worm gear 9W eliminates the need for a stopper separately provided and holding the swinging ring and the sectors at the stop positions. This makes it possible to provide the small-sized lens barrier apparatus where the sectors stably swing. The lens barrier apparatus may be configured to be detachably provided in the lens body tube 4 and may also be configured to be integrally set at the front side of the lens body tube 4.

Figure 10:
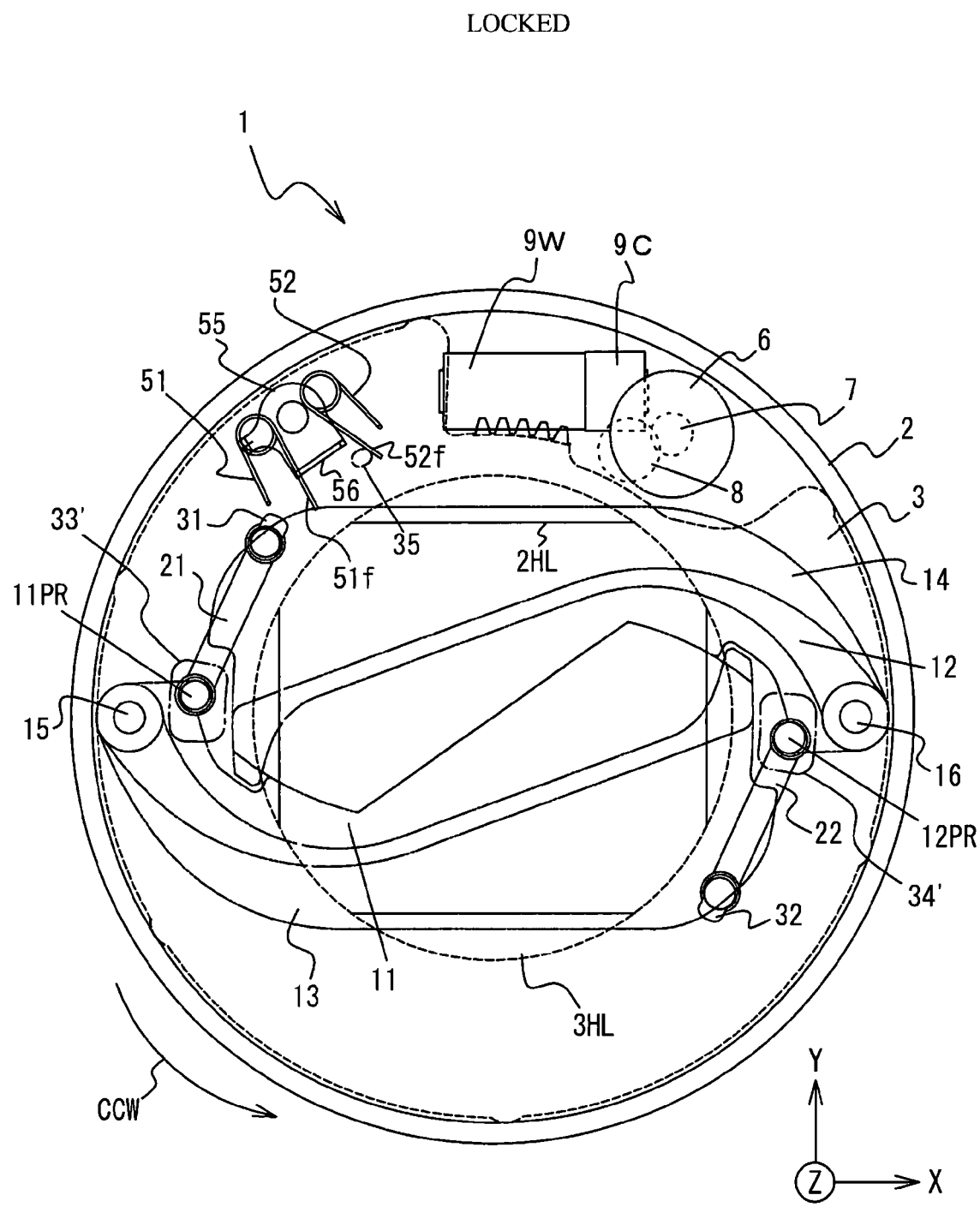
FIG. 10 is a view showing another embodiment.

Also, as shown in FIG. 10, the apertures 33 and 34 provided in the swinging ring 3 may be modified to be apertures 33' and 34' having a longer shape in a swinging direction of the projections 11PR and 12PR, and when in the locked state of FIG. 7, the projections 11PR and 12PR may be configured not to be in contact with the apertures 33' and 34'. In other words, the apertures 33' and 34' are configured to be longer than the apertures 33 and 34, so that there is more space for the movement of the projections 11PR and 12PR in shifting to the closed state or to the locked state, and the sectors 11 and 12 can move in the opening direction. With this configuration, at the time of the locked state, the swinging ring 3 is rotated more than the closed state of FIG. 1. Even if the biasing forces of the coil springs 21 and 22 are applied, namely, an external force is applied, the sectors will not open easily. Also, if a foreign material should enter between the sectors 11 and 12 during shifting to the closed state, the projections 11PR and 12PR not in contact with the apertures 33' and 34' allow the sectors 11 and 12 to move in the opening direction against the biasing forces of the coil springs 21 and 22. Accordingly, even if a foreign material is sandwiched during shifting to the closed state or to the locked state, the sectors 11 and 12 can move relatively with respect to the swinging ring 3 in the opening direction and the swinging ring 3 and the worm gear 9W are not unnecessarily stressed. This eliminates the possibility of the gear damage or the like.

Figure 11:
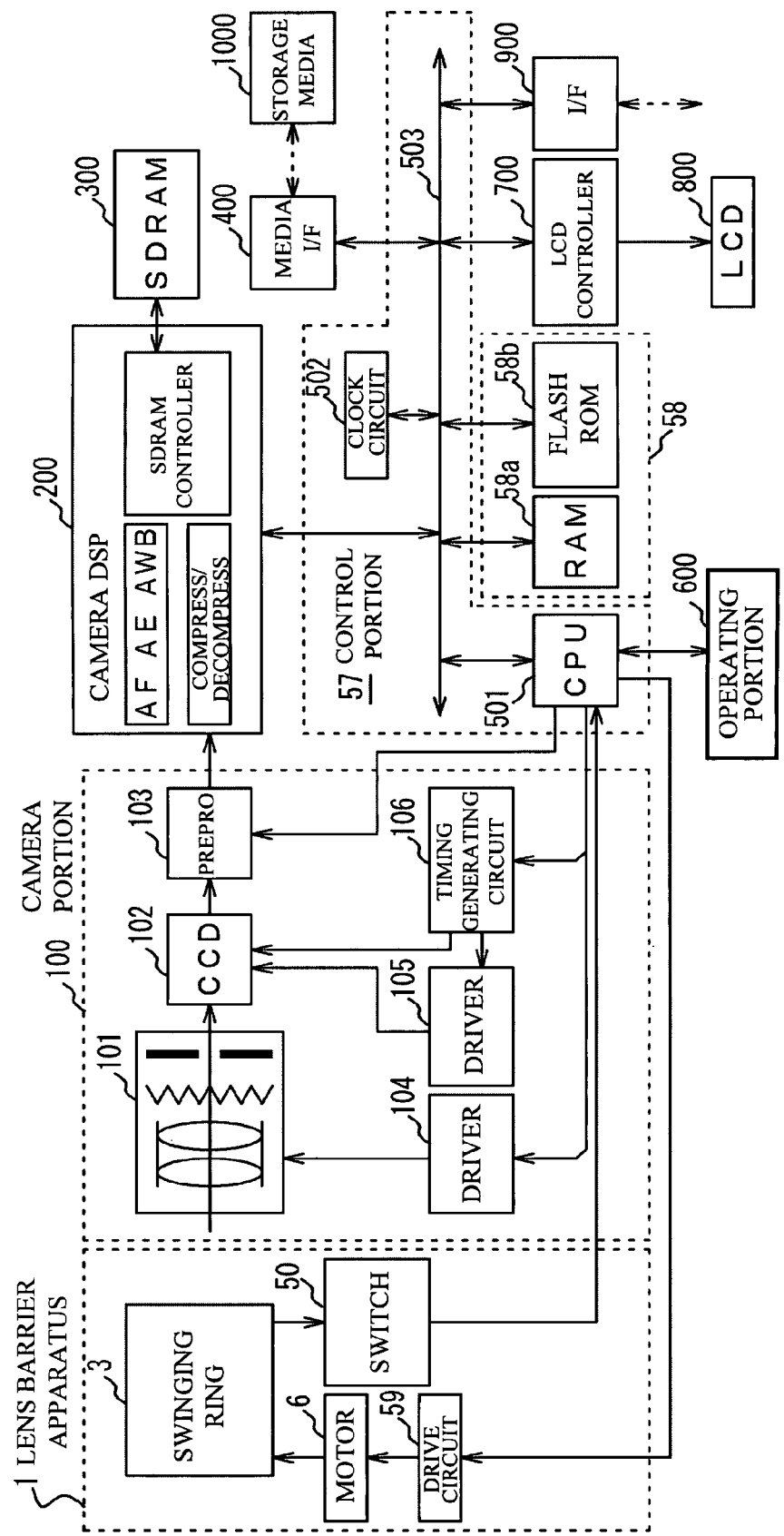
FIG. 11 is a block diagram of an image pickup apparatus including a lens barrier apparatus.

FIG. 11 is an explanatory block diagram of an image pickup apparatus including the lens barrier apparatus employed in the present invention. As shown in FIG. 11, roughly speaking, the image pickup apparatus employed in an embodiment of the present invention includes: the lens barrier apparatus 1; a camera portion 100; a camera DSP (Digital Signal Processor) 200; an SDRAM (Synchronous Dynamic Random Access Memory) 300; a media interface 400; the control portion 57; an operating portion 600; an LCD (Liquid Crystal Display) controller 700; an LCD 800; and an external interface (hereinafter, referred to as external I/F) 900. A storage media 1000 is removably attached.

As the storage media 1000, a so-called memory card with a semiconductor memory, optical storage media such as a recordable DVD (Digital Versatile Disc) or recordable CD (Compact Disc), magnetic disc, or other various types may be employed. However, in the present embodiment of the present invention, for instance, a memory card is used as the storage media 1000.

The lens barrier apparatus 1 includes: the swinging ring 3 driving the sectors 11 through 14; the switch mechanism 50; the drive circuit 59; and the motor 6, as described heretofore. The camera portion 100 includes: an optical block 101; a CCD (Charge Coupled Device) 102; a preprocessing circuit 103; an optical block driver 104; a CCD driver 105; and a timing generating circuit 106, as shown in FIG. 11. Herein, the optical block 101 is equipped with: a lens; focus mechanism; shutter mechanism; aperture (iris) mechanism; and the like.

In addition, the control portion 57 has a configuration where a CPU (Central Processing Unit) 501 and a clock circuit 502 are coupled through a system bus 503, and is capable of controlling each part of the image pickup apparatus employed in the present embodiment. The clock circuit 502 is capable of timing current year, month, day, current day of the week, and current time, and providing a date and time when an image is taken. The memory portion 58 includes: a RAM (Random Access Memory) 58a; and a flash ROM (Read Only Memory) 58b, both being connected to the control portion 57. The RAM 58a is mainly used for a work area to temporarily store data in the process. Also, the ROM 58b stores various programs implemented by the CPU 501 and data necessary for processing.

The operation of the lens barrier apparatus is performed by controlling the motor 6 by the CPU 501 via the drive circuit 59. The operation of the lens barrier apparatus 1 has been described above, and will be omitted here. Also, the open or closed state of the sectors 11 through 14 can be detected by the switch mechanism 50. Since the data related to on/off of the SW1 and the SW2 is output from the switch mechanism 50 to the control portion 57, the CPU 501 is capable of controlling the opening and closing operations of the sectors 11 through 14 by controlling the drive circuit 59 and the motor 6 according to the states of the SW1 and the SW2.

When taking an image, the optical block driver 104 generates a drive signal to activate the optical block 101 according to the control of the control portion 57, and supplies the signal to the optical block 101, so that the optical block 101 operates. The focus mechanism, shutter mechanism, diaphragm mechanism are controlled on the basis of the drive signal fed by the driver 104, the optical block 101 takes in the image of a subject and supplied the image to the CCD 102.

The CCD 102 is provided for converting the image supplied from the optical block 101 and then outputting the converted image, and operates according to the drive signal fed by the CCD driver 105. The CCD 102 takes in the shape of the subject supplied by the optical block 101 as an image, and feeds such taken image of the subject (image information) to the preprocessing circuit 103 as an electric signal on the basis of a timing signal supplied by the timing generating circuit 106 controlled by the control portion 57.

As described above, the timing generating circuit 106 is provided for generating timing signals that provide given timings, according to the control of the control portion 57. Also, the CCD driver 105 is provided for generating the drive signals fed to the CCD 102, on the basis of the timing signal fed by the timing generating circuit 106.

The preprocessing circuit 103 performs a CDS (Correlated Double Sampling) process on the image information of the electric signal supplied thereto, and performs an AGC (Automatic Gain Control) process to control gain, and then performs an A/D (Analog/Digital) conversion to create image data formed into digital signals. The image data converted into the digital signals from the preprocessing circuit 103 is supplied to the DSP 200. The DSP 200 implements on image data supplied thereto, camera signal processes such as AF (Auto Focus), AE (Auto Exposure), AWB (Auto White Balance), and the like. In this manner, the image data in which various adjustments have been performed is compressed by a given compression technique, and is supplied to the storage media 1000 installed in the image pickup apparatus employed in the present embodiment, and is then stored as a file in the storage media 1000, described later again.

In addition, from the image data stored in the storage media 1000, desired image data is read from the storage media 1000 through the media I/F 400, according to the user's operation by use of the operating portion 600 composed of a touch panel or control keys, and the image data is supplied to the DSP 200.

The DSP 200 decompresses the compresses data (data extension) of the image data supplied from the media I/F 400 after reading from the storage media 1000, and supplies the decompressed image data through the system bus 503 to the LCD controller 700. The LCD controller 700 generates an image signal to be fed to the LCD 800 with the image data supplied, and feeds the signal to the LCD 800. In this manner, the image corresponding to the image data stored in the storage media 1000 is displayed in a display screen of the LCD 800.

Here, the image is displayed according to a display process program stored in the ROM 58b. That is, the display process program offers how the file system is stored and how the image is reproduced, as will be described later. Also, the image pickup apparatus employed in the present embodiment is provided with the external I/F 900. With the external I/F 900, for example, an external personal computer can be connected to receive the image data therefrom and store the image data in the storage media installed in the image pickup apparatus, or to output the image data stored in the storage media installed in the image pickup apparatus to the external personal computer.

Furthermore, by attaching a communication module to the external I/F 900, the network such as the internet can be connected so that various types of image data or other information can be acquired through the network to store in the storage media installed in the image pickup apparatus or to send the image data stored in the storage media installed in the image pickup apparatus to another user over the network. Also, a user is able to read in and reproduce on the image pickup apparatus employed in the present embodiment and display on the LCD 800, the information of image data acquired through the external personal computer or the network and stored in the storage media. Herein, the external I/F 900 may be provided as a wired interface such as IEEE (Institute of Electrical and Electronics Engineers) 1394, USB (Universal Serial Bus), and the like, and may also be provided as a wireless interface by use of lights or electric waves. In short, the external I/F 900 may be either a wired or wireless interface.

As stated heretofore, the image pickup apparatus employed in the present embodiment is capable of taking an image of a subject and storing the image in a storage media installed in the image pickup apparatus, and is also capable of reading the image data, and reproducing and using the image data. In addition, the image pickup apparatus employed in the present embodiment is capable of receiving the image data via an external personal computer or the network, storing the image data in the storage media installed therein and reading and reproducing the image data.

As described above, according to an aspect of the present invention, it is possible to provide a small-sized lens barrier apparatus in which sectors can be retained stably at a closed position.

While the preferred embodiments of the present invention have been illustrated in detail, the present invention is not limited to the above-mentioned embodiments, and other embodiments, variations and modifications may be made without departing from the scope of the present invention.

What is claimed is:

1. A lens barrier module comprising:
a substrate in which an opening is defined;
sectors opening the opening when picking up an image and closing the opening when not picking up the image, said sectors including at least a first inner sector;
a projection formed on said first inner sector;
a swinging ring forming an aperture, wherein said projection projects through the aperture;
a gear train provided on the swinging ring;
a motor provided at the substrate and driving the sectors; and
a worm gear engaging the swinging ring and transmitting a drive power from the motor.

2. The lens barrier module as claimed in claim 1, wherein the substrate includes a sector substrate in which the sectors are provided and a motor substrate in which the motor is provided.

3. An image pickup apparatus in which a lens barrier module is mounted, the lens barrier module comprising:
a substrate in which an opening is defined;
sectors opening the opening when picking up an image and closing the opening when not picking up the image, said sectors including at least a first inner sector;
a projection formed on said first inner sector;
a swinging ring forming an aperture, wherein said projection projects through the aperture;
a gear train provided on the swinging ring;
a motor provided at the substrate and driving the sectors; and
a worm gear engaging the swinging ring and transmitting a drive power from the motor.

4. A lens barrier module comprising:
a substrate in which an opening is defined;
sectors opening the opening when picking up an image and closing the opening when not picking up the image; and
a motor provided at the substrate and driving the sectors,
wherein: the substrate includes a sector substrate in which the sectors are provided and a motor substrate in which the motor portion is provided, wherein said sector substrate is formed in a cylindrical shape and said motor substrate is positioned inside the cylindrical shape of said sector substrate; and
the sector substrate houses the motor and the motor substrate.

5. An image pickup apparatus in which a lens barrier module is mounted, the lens barrier module comprising:
a substrate in which an opening is defined;
sectors opening the opening when picking up an image and closing the opening when not picking up the image; and
a motor provided at the substrate and driving the sectors,
wherein: the substrate includes a sector substrate in which the sectors are provided and a motor substrate in which the motor portion is provided, wherein said sector substrate is formed in a cylindrical shape and said motor substrate is positioned inside the cylindrical shape of said sector substrate; and
the sector substrate houses the motor and the motor substrate.

* * * * *